Nov. 22, 1966  H. W. F. DOMNICK  3,286,613
TWO-FILM CAMERA
Filed March 2, 1965  7 Sheets-Sheet 2
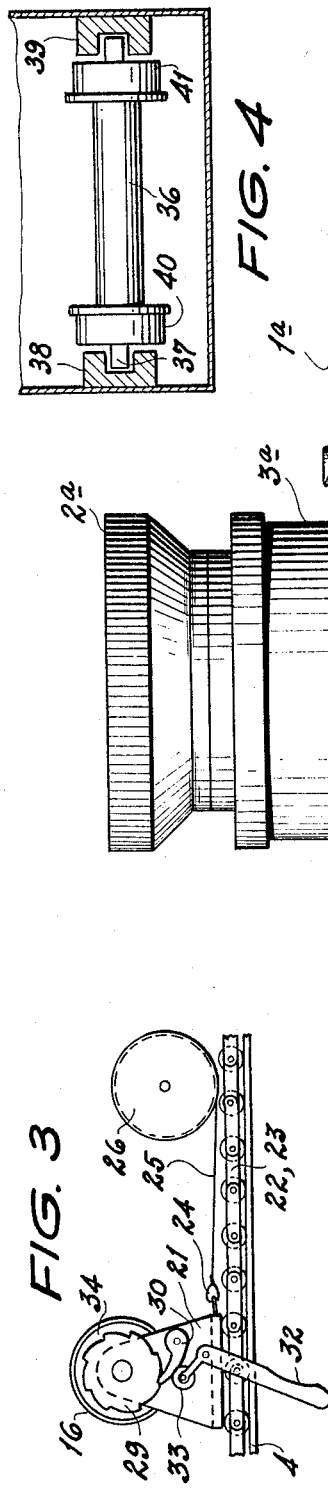
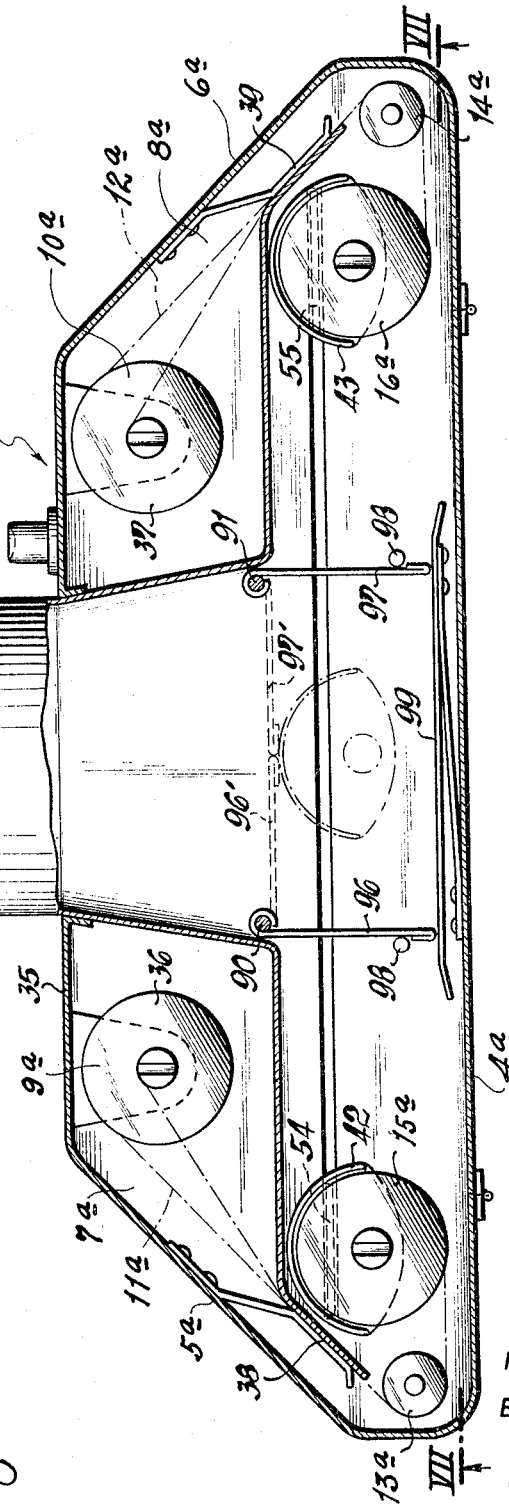
INVENTOR
HANS DOMNICK
BY:
ATTORNEY

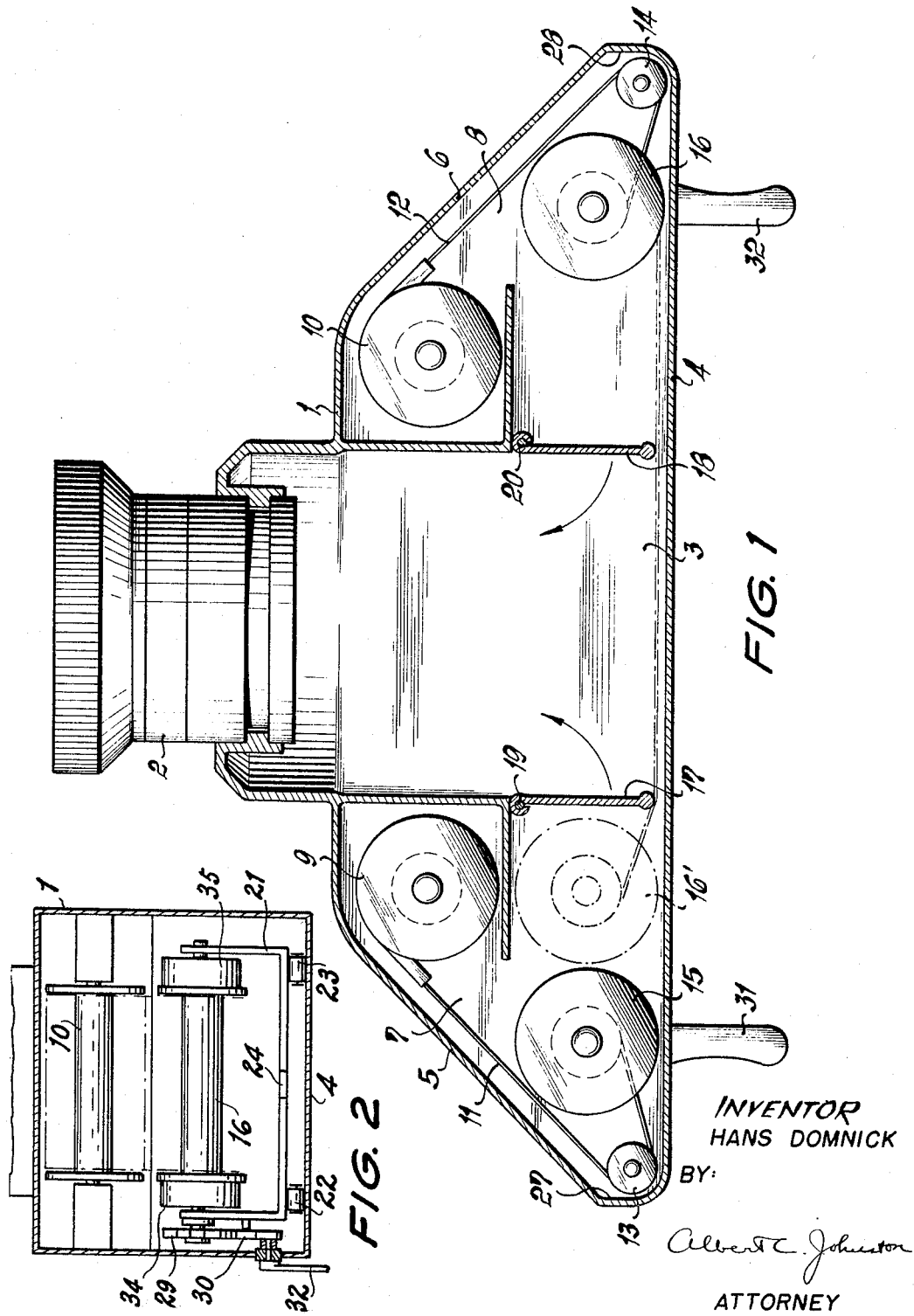

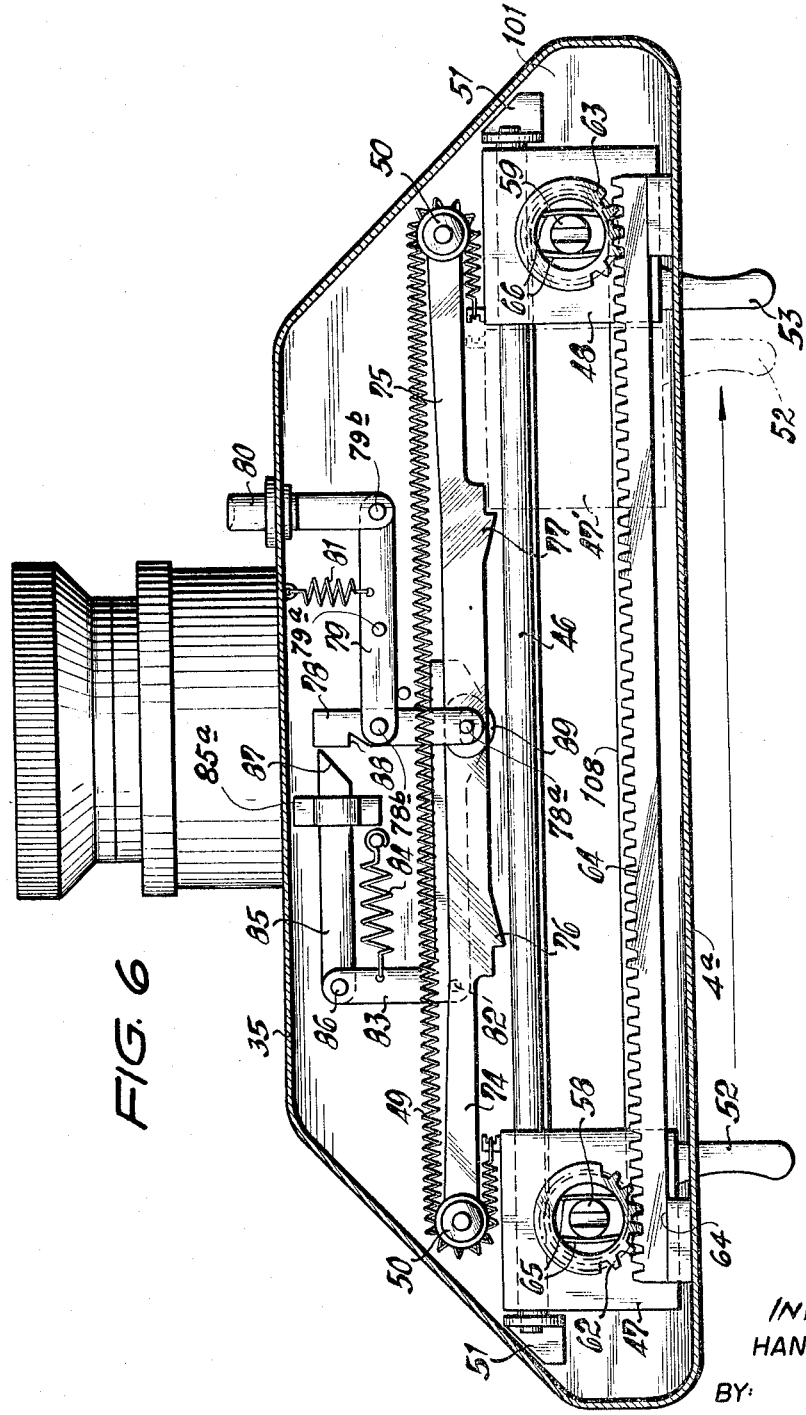

Nov. 22, 1966      H. W. F. DOMNICK      3,286,613
           TWO-FILM CAMERA
Filed March 2, 1965                    7 Sheets-Sheet 4

FIG. 7

INVENTOR
HANS DOMNICK
BY:
Albert C. Johnston
ATTORNEY

Nov. 22, 1966  H. W. F. DOMNICK  3,286,613
TWO-FILM CAMERA
Filed March 2. 1965  7 Sheets-Sheet 5

INVENTOR
HANS DOMNICK
BY:
Albert C. Johnston
ATTORNEY

INVENTOR
HANS DOMNICK
BY:
ATTORNEY

3,286,613
TWO-FILM CAMERA
Hans W. F. Domnick, Steubenstrasse 23,
Wiesbaden, Germany
Filed Mar. 2, 1965, Ser. No. 436,489
23 Claims. (Cl. 95—31)

This invention relates generally to two-film photographic cameras, and this application is a continuation-in-part of my copending application for U.S. Letters Patent, identified as Serial No. 279,084, filed May 9, 1963 and now abandoned.

There is an increasing demand for a photographic camera which permits either one of two types of film, for example, a black-and-white and a color film, to be exposed at will without the necessity of unloading and reloading the camera. That is to say, the camera must carry both types of film and either of them may be selected for a particular photograph.

Various proposals have already been made to accomplish this purpose. For instance, one such proposal consists in completely duplexing the design of the camera, that is to say, providing two objectives, two magazines for the films and so forth, for selective operation. Effectively this device consists in two cameras joined together. It need hardly be stressed that such an arrangement is not only expensive, but also increases the weight and the bulk of the camera to an inconvenient extent, rendering such apparatus rather unsuitable for use in expeditions and similar purposes where the weight and bulk of equipment are important factors. In another arrangement the two films are extended parallel to the optical axis of the objective lens and a deflectable mirror system is required for selectively directing the image from the lens to one or the other of the two films. Still another device contains two films extended at right angles to each other. This arrangement requires a swivelling objective lens which involves an awkwardness of construction far exceeding the limits of what is acceptable in an ordinary camera. Apart from the above proposals, cameras having various specialized forms of movable magazines, objective mounts and interchangeable magazines are in existence. It is a feature common to all these devices that they significantly enlarge the camera body, some also very substantially increasing its weight, and that their many mechanical parts increase the fault liability of the apparatus.

The cameras for two films embodying the present invention overcome all these drawbacks. The cameras in accordance with the invention employ an arrangement already known in the art, and which comprises a pair of spools for each of two films, one spool of each pair being held in a stationary mount, whereas the other spool of each pair is displaceable across the image field or focal plane of the objective lens. However, in the known camera employing the described arrangement, the two movable spools are both mounted in a single support to form one assembly and function as the unwinding spools, so that their displacement in conjunction with the required rewinding of the exposed film leads to considerable complexities in design and necessitates considerable space.

One object of the invention is to provide a two-film camera which is of light weight and compact construction.

Another object is to provide a two-film camera in which the movable spools of the two pairs of spools for the respective films are not mounted in a single support, but rather are individually movable, and in which the mechanism for selectively exposing one or the other of the two films is extremely simple.

Another object of the invention is to provide an advantageous manner of arranging and transporting film in a camera, whereby the construction and operation of the camera can be simplified and whereby unperforated film can be used to obtain images of increased size.

Still another object is to provide a camera having for each film a movable spool which may be moved from one side of the camera to the other to draw an unused length of the film into the focal plane for exposure, and in which, after exposure is made, the movable spool simultaneously winds up the exposed length of film and removes the film from the focal plane.

A still further object is to provide a two-film camera in which an unused length of either one of two films may be drawn into position for exposure in the focal plane of the camera by moving a movable spool associated with the selected film from one side of the camera to the other, and in which the act of moving the selected spool causes the camera shutter to be cocked or wound up.

According to the present invention, a supply of unexposed film in strip form, such as a roll of the film, is disposed in a magazine to one side of the image field of the camera with the leading end of the film attached to a movable winding spool that normally is disposed at a rest position in the same magazine; and for the making of each exposure a length of the film is drawn from the magazine into the image field by a displacement of the winding spool across the image field to a working position at the opposite side of the image field, the spool being held against rotation during at least part of this displacement. Then, after the exposure, the film is entirely removed from the image field and the exposed length is simultaneously wound onto the winding spool by a combined displacement and rolling movement of the winding spool back to its normal rest position.

A muti-film camera, for example, one holding two different films in readiness for the use of either of them whenever desired, is provided according to the invention by making the camera body with similar magazines at two opposite sides of the exposure chamber and providing in each magazine a supply of unexposed film having its leading end attached to a winding spool that is movable as above described. Each winding spool is mounted on a sliding mount or carrier in association with suitable means for locking the spool against rotation during its film feeding movement and with means for rotating the spool so as to wind the exposed film upon it during its return movement. There is also provided in each magazine, at a location between the normal rest position of the winding spool normally held therein and the image field of the camera, the working position to which the winding spool that normally is held in the opposite magazine may be displaced in order to draw the film attached to it into the image field for exposure.

Broadly, a two-film camera according to the present invention is constructed so that either of the two movable winding spools is selectively displaceable into working position and is locked against rotation during at least part of such displacement in order to draw a length of the selected film into position for exposure, and each winding spool is urged, as by spring means, to roll back unlocked into its former position of rest, thereby winding up the exposed length of film.

The advantage of this form of mechanism resides not only in the resultant structural simplicity of the camera and the uncomplicated method of controlling the film while avoiding the possibility of the formation of loops therein, but, above all, in the fact that the film winding action can be effected without special auxiliary devices, without regard to the diameter, at any instant, of the roll of film on the spool, and irrespective of whether a perforated or an unperforated film is being used. Furthermore, sufficient space remains, without undesirably enlarging the camera, for accommodating other special devices, such as a reflex view finder system, a focal plane shutter and so forth. Despite the presence of two separate films, the feeding of unexposed lengths of either of the films is quite simply achieved and lends itself to being largely performed automatically.

The invention may be embodied in several different structural forms. For instance, the movable spools may be held in slidable mounts or carriers yieldably urged to their normal rest positions, such as by tapes attached to spring drums, of a kind substantially similar to the spring drums used for moving typewriter carriages, and the movable spools may be subject to the torque generated by spiral springs urging them to rotate relative to their slidable mounts or carriers in the winding direction. An alternative arrangement would consist in discarding the spring or springs acting on the slidable mounts or carriers and in causing the spools to roll back into their rest positions merely by the torque exerted by the spiral springs for urging the spools to rotate in the film winding direction.

The above, and other objects, features and advantages of the invention, will be apparent in the following detailed description of illustrative embodiments thereof which is to be read in connection with the accompanying drawings, wherein:

FIG. 1 is a diagrammatic plan view illustrating the general arrangement and principle of operation of a camera according to the invention;

FIG. 2 is a fragmentary side elevational view, with the housing or body of the camera cut away, and showing the arrangement of the spools at one side of the camera in one embodiment of the invention;

FIG. 3 is a detail plan view of the structural arrangement associated with each of the movable winding spools in the embodiment of FIG. 2;

FIG. 4 is a fragmentary side elevational view illustrating an alternative arrangement of each movable winding spool in a camera embodying this invention;

FIG. 5 is a horizontal sectional view of a camera in accordance with still another embodiment of the invention, such view being taken along the line V—V on FIG. 7;

FIG. 6 is a horizontal sectional view taken along the line VI—VI on FIG. 7;

FIG. 7 is a vertical sectional view taken along the line VII—VII on FIG. 5;

Figure 8:
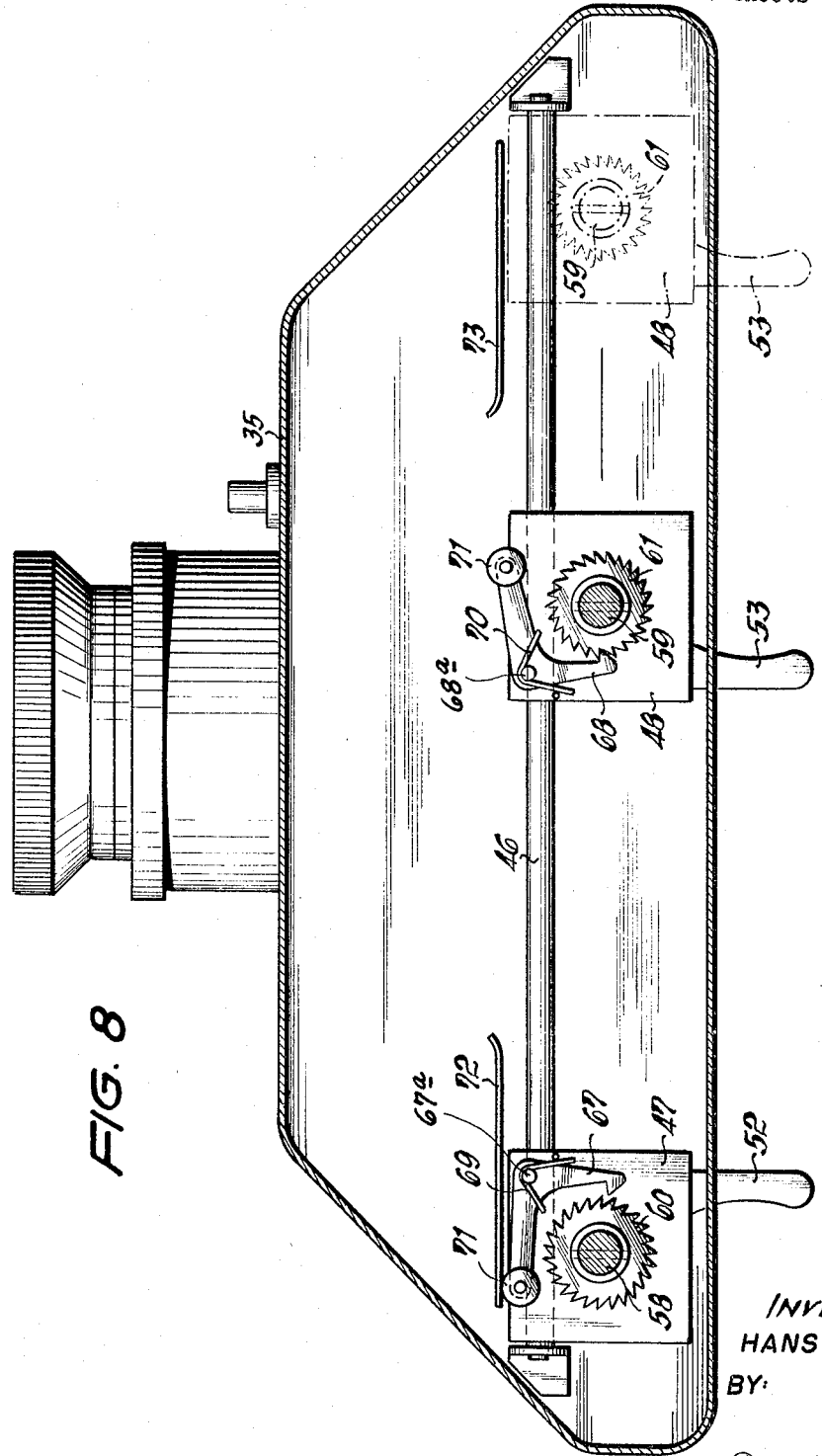
FIG. 8 is a horizontal sectional view taken along the line VIII—VIII on FIG. 7.

Referring first to FIG. 1, it will be seen that the camera generally includes a body or housing 1. The front of the camera carries the objective 2 which defines an image field within an exposure chamber 3 which is centrally located in body 1 and closed at the rear by the backing wall 4 for the film. Lateral magazine covers 5 and 6 are detachably or swingably mounted on magazines 7 and 8 provided at opposite sides of exposure chamber 3 and permit the films to be easily removed and replaced. Unwinding spools 9 and 10 are rotatably mounted at fixed locations in the magazines 7 and 8 of the camera and respectively receive supplies of unexposed films 11 and 12 in strip form. The two films 11 and 12 can be unwound from these spools and, after running over guide rollers 13 and 14 disposed adjacent the outer sides of the magazines, are rewound onto respective winding spools 15 and 16. The sides of the exposure chamber 3 comprise flaps 17 and 18, hingeably mounted on pivot pins 19 and 20. Springs (not shown) normally urge these flaps into the illustrated positions and they therefore form a light trap between the two magazine chambers 7 and 8 and the exposure chamber.

In order to permit either of the two films 11 and 12 to be selectively used whenever desired, the winding spools 15 and 16 are mounted so as to be movable across the exposure chamber 3 along a path in front of the rear wall 4 of the camera body. An individual mounting structure for this purpose is provided for each of the spools 15 and 16, there being an operating lever or handle 31 associated with the mounting structure for the spool 15 and an operating lever or handle 32 associated with the mounting structure for the spool 16. Only the mounting structure and operating mechanism associated with the spool 16 are shown in FIGS. 2 and 3, it being understood that the other mounting structure and operating mechanism are similar but reversed from left to right in construction. The spool 16 in the embodiment illustrated in FIGS. 2 and 3 is rotatably mounted in a mount or carrier 21 which is slidably movable, for example, on a roller track 22, 23. The sliding mount or carrier is attached, as by an eyelet 24 with one end of a draw tape 25 having its other end wound onto a spring drum 26 which may be similar to the type used for the return of the carriage in typewriters. The spring drum for the carrier or sliding mount 21 is located adjacent the end wall 28 of the magazine 8 and it automatically retracts or urges the sliding mount to which the tape 25 is attached into the chamber 8 so as to locate the winding spool 16 at the illustrated rest position at which it is normally situated.

Rotatably coupled to the shaft of the winding spool 16 is a ratchet wheel 29 which cooperates with a pawl 30. The arrangement is such that the pawl 30 is normally kept out of engagement with the ratchet wheel 29 by a spring (not shown) but is engageable by a roller 33 on the lever 32 which forms a handle and is pivotally mounted on the sliding mount 21. The arrangement is such that, when the sliding mount 21 and the winding spool 16 are displaced, by means of manually actuating the handle 32, so as to move spool 16 across the exposure chamber from its rest position to a working position indicated in broken lines at 16 on FIG. 1, the lever or handle 32 is rocked by the force applied thereto and its roller 33 acts on the pawl 30 to move the latter into engagement with ratchet wheel 29 for locking the spool 16 and preventing it from rotating. Preferably, the arrangement should be so contrived that the pawl will not lock the spool 16 against rotation until the latter has been moved away from its rest position and has reached the flap 18 in order to permit the unexposed portion of film, which was rewound onto the spool 16 following the previous exposure, to unwind from spool 16. Otherwise, there will be an undue gap between negatives on the film and a proportion of the film will be wasted. This delay in the movement of the pawl into engagement with the ratchet wheel can be achieved in any convenient way, for instance, by the provision of retaining guide means or the like.

As the spool 16 is drawn over the back of the camera and is held against rotation in the manner described to withdraw unexposed film from the related supply of film on spool 10, it will first temporarily deflect flaps 18 and 17, which immediately reclose when the spool has passed through the exposure chamber to its working position 16′, and then retain the film in the image field or focal plane of the camera objective or optical system. The same thing occurs when spool 15 is displaced from its illustrated rest position across the back of the camera and passes through flaps 17 and 18 for withdrawing unused film from the unwinding spool 9.

It will be readily understood that retaining means of a suitable conventional kind (not shown) may be provided to hold each sliding mount 21 in its working position, as at 16′, while the exposure is made. As soon as the film has been exposed such retaining means are released, possibly automatically in response to the actuation of the mechanism for operating the shutter, thereby permitting the spring drum 26 to retract the sliding mount 21 into its normal rest position in the magazine, that is, in the position indicated at 15 or 16, as the case may be.

Each of the winding spools 15 and 16 is loaded by spiral springs contained inside boxes 34 and 35 and tending to turn the respective spool in the winding direction when ratchet wheel 29 and pawl 30 are not in engagement with each other. These spiral springs therefore keep the film taut when the sliding mount is stationary and wind up the film onto the respective spool 15 or 16 as the mount returns to its position of rest. The springs contained in the boxes 34 and 35 are not sufficiently powerful to withdraw film from the spool 9 or 10 on their own.

From the foregoing description it will be clear that the operation and control of the camera are extremely simple. If the lever or handle 32 is pulled to the left, as viewed on FIG. 1, spool 16 on its sliding mount is displaced from its rest position to its working position 16' lying between spool 15 in its rest position and the adjacent side of exposure chamber 3, at which working position the sliding mount is retained. Since the ratchet and pawl 29, 30 engaged during movement of the mount 21 across the image field in chamber 3, the spool 16 cannot turn during this traversing motion and it therefore withdraws a suitable length of unexposed film from spool 10. As has been mentioned, this movement of the mount 21 of either spool 15 or 16 may also be arranged to cock the camera shutter. After the exposure has been made, the retaining means for holding the spool 15 or 16 in its working position is released to permit the spring drum 26 to pull back the sliding mount 21 to its normal position of rest, with the springs in the boxes 34, 35 rotating the spool 16 (clockwise in FIGS. 1 and 3) during such return movement and causing the exposed length of film to be wound up on spool 16.

Referring now to FIG. 4, it will be seen that an arrangement can be provided in accordance with this invention in which the return of each winding spool to its rest position is effected by the spiral springs urging the spool to rotate in the winding direction, and the spring drum 26 of FIG. 3 is eliminated. In the alternative arrangement of FIG. 4, each winding spool 36 is rotatably mounted on a shaft 37 having its ends non-rotatably slidable in guide slots 38 and 39 extending parallel to the back wall of the camera body. Spiral springs (not shown) are contained in casings 40 and 41 and the ends of such spiral springs are connected to the non-rotatable shaft 37 and to the spool 36, respectively, so as to urge the spool to rotate in the direction for winding film thereon. Hence, when the spool 36 is released after an exposure, the spool will be made to roll back to its rest position, by means of the springs in casings 40 and 41, and will wind-up the exposed film during such rolling movement and also correspondingly return the associated carrier or sliding mount to its rest position.

Referring now to FIGS. 5 to 10, inclusive, it will be seen that, in a preferred structural embodiment of the invention, the camera once again comprises a housing or body 1a having a centrally located exposure chamber 3a within which the image field or focal plane of an objective 2a is defined so as to lie adjacent the back wall 4a of the camera body. The housing or body 1a further defines magazines 7a and 8a located at the opposite sides of exposure chamber 3a and having hinged wall portions 5a and 6a, respectively.

The two unwinding spools 9a and 10a are rotatably mounted at fixed locations in magazines 7a and 8a, respectively, and carry rolls of film, say a black-and-white-film on the left spool 9a and a color film on the right spool 10a, and such films are directed through film-brakes 38a and 39a round guide rollers 13 and 14 to the winding spools 15a and 16a seated in movable spool holders or carriers 42 and 43. The unwinding or supply spools 9a and 10a and the plate springs of the film-brakes 38 and 39 are preferably supported from the hinged wall portions 5a and 6a so as to swing out with the latter and thereby facilitate replacement of the film supplies.

As shown particularly on FIG. 7, the camera body 1a has upper and lower horizontal partitions 101 and 102 extending laterally thereacross and spaced from the top and bottom walls 103 and 104, respectively, to form relatively shallow upper and lower compartments 105 and 106.

The spool holders or carriers 42 and 43 are disposed between partitions 101 and 102 and suspended from slides 47 and 48 moving on a slide rod 46 (FIGS. 6 and 7) which is mounted in the upper compartment 105 of the camera body. Slides 42 and 43 are connected to the opposite ends of a tension spring 49 running round guide rollers 50, so that the spring 49 tends to pull the slides to their rest positions against the stops 51 which support rod 46 on partition 101. The operating levers or handles 52 and 53 project from slides 47 and 48 through a slot in the back wall 4a of the camera body. The spool holders 42, 43 are guided, at their lower ends, by means of elongated straight guiding pieces 54 and 55 (FIGS. 7, 9 and 10) which are slidable in a slot 107 extending laterally in lower partition 102 whereby swinging and turning of the spool holders or carriers is prevented.

The connections between the spool holders or carriers 42 and 43 and the respective slides 47 and 48 are constituted by sleeves or tubular bushings 56 and 57 (FIG. 7) which pass through an elongated, laterally extending slot 108 (FIGS. 6 and 7) in the upper partition 101. Shafts 58 and 59 are rotatable in the sleeves 56 and 57 and, at their lower ends, project into the respective spool holders and are formed, as at 58a and 50a, to provide rotatable couplings with the winding spools 15a and 16a rotatably inserted in the holders 42 and 43.

Figure 10:
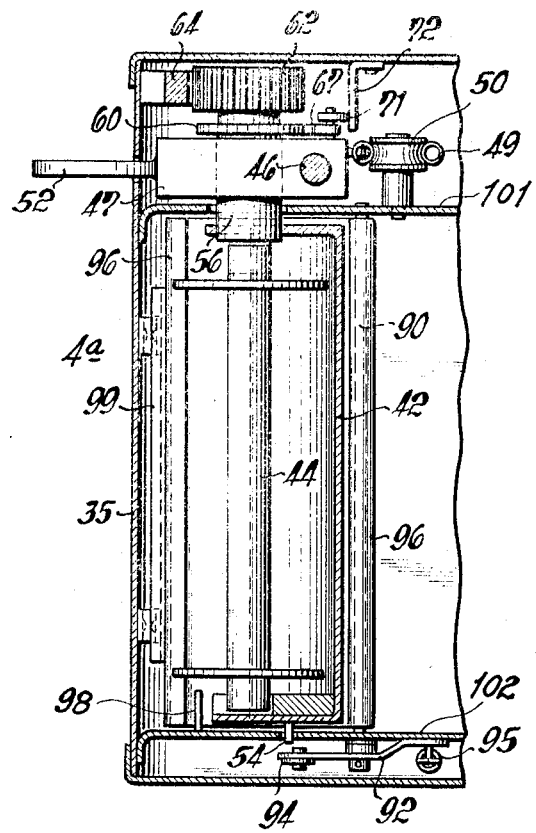
FIG. 10 is a vertical sectional view taken along the line X—X on FIG. 7.

As shown on FIGS. 7, 8 and 10, ratchet wheels 60 and 61 are secured, as by pins or the like, on shafts 58 and 59 at locations immediately above the slides 47 and 48. The shafts 58 and 59 further carry gears 62 and 63 at locations above the ratchet wheels 60 and 61, and the gears 62 and 63 both mesh with a gear rack 64 (FIG. 6) which extends laterally on back wall 4a within the upper compartment 105. The gears 62 and 63 are only frictionally coupled to the respective shafts 58 and 59, for example, by means of plate springs 65 and 66 extending chordally within recesses of the gears 62 and 63 and frictionally contacting the surfaces of the shafts 58 and 59 at diametrically opposed locations on such shafts.

As shown on FIG. 8, the slides 47 and 48 have pawls 67 and 68 pivotally mounted thereon, as at 67a and 68a, respectively, and the pawls 67 and 68 are acted upon by springs 69 and 70 so as to be urged into engagement with the adjacent ratchet wheels 60 and 61. The ratchet wheels 60 and 61 and the corresponding pawls 67 and 68 are arranged so that, upon engagement thereof, the respective winding spools 15a and 16a are prevented from turning in the direction for unwinding film therefrom.

The pawls 67 and 68 carry rollers 71 which are engageable with guide tracks 72 and 73 so as to rock the pawls 67 and 68 out of engagement with the respective ratchet wheels 60 and 61. The guide tracks 72 and 73 are positioned and dimensioned, as particularly shown on FIG. 8, so as to engage the rollers 71 of the respective pawls 67 and 68 only during the movement of the holders 42 and 43 with the winding spools 15a and 16a mounted therein from the normal rest positions of the holders, shown in full lines on FIG. 5, up to the adjacent sides of the exposure chamber 3a.

As is shown on FIG. 5, the holders or carriers 42 and 43, and the respective winding spools 15a and 16a, when in their normal rest positions within the magazines 7a and 8a, are spaced substantially from the adjacent sides of exposure chamber 3a. When either of the spool holders or carriers 42 and 43 is displaced from its normal rest position across exposure chamber 3a to its working position in order to extend a length of unexposed film across the exposure chamber in the focal plane or image field of the objective 2a, the displaced spool holder or carrier is then located between the rest position of the other spool carrier and the side of the exposure chamber adjacent thereto, for example, as by movement of the slide 47 to the position shown in broken lines at 47' on FIG. 6.

The upper compartment 105 of the camera body or housing also contains a releasable mechanism for retaining one or the other of the slides 47 and 48 in the position corresponding to the working position of the related spool holder or carrier 42 or 43. As shown on FIG. 6, such releasable retaining mechanism includes elongated levers 74 and 75 which are pivoted on the shafts of guide rollers 50, and which extend laterally inward from the latter. The back edges of levers 74 and 75 are respectively formed with noses 76 and 77 which are engageable with the slides 48 and 47, respectively, so as to hold the slides in their fully displaced positions, for example, as indicated at 47' for the slide 47. A link 78 is pivotally connected, at its back end, to the inner end portions of levers 74 and 75, for example, by a pin 78a engaging in elongated slots formed in levers 74 and 75. Link 78 is further pivotally connected, at 78b, with one end of a lever 79 which is pivotally mounted intermediate its ends, as at 79a, and has its other end pivotally connected, as at 79b, to a push-button 80 extending from the camera housing or body. A spring 81 is connected to lever 79 so as to urge the latter in the direction moving link 78 rearwardly, thereby to project noses 76 and 77 into the path of movement of slides 47 and 48 on rod 46. However, when push-button 80 is depressed, link 78 is moved forwardly and similarly rocks levers 74 and 75 so as to withdraw noses 76 and 77 from the path of movement of slides 47 and 48.

The retaining mechanism further includes a bell crank 83 pivotally mounted at 82 and having a forwardly directed arm which is pivotally connected, as at 86, to a laterally directed latch 85. The latch 85 is slidable in a bracket 85a and formed with a nose 87 at its inner end engageable in a notch 88 formed in link 78. A spring 84 is connected to bell crank 83 to urge the latter in the direction moving the nose 87 of latch 85 toward link 78. Thus, when pushbutton 80 has been depressed to withdraw the noses 76 and 77 of levers 74 and 75 from the path of movement of slides 47 and 48, nose 87 of latch 85 engages in notch 88 to retain link 78 in the position for withdrawing or rendering inoperative noses 76 and 77. The laterally extending arm of bell crank 83 has a hump or rounded projection 89 formed at its back edge, and such hump 89 projects into the path of movement of slides 47 and 48 so that, during the movement of either of the slides past the central portion of rod 46, such slide engages hump 89 to rock bell crank 83 in the direction for releasing nose 87 of latch 85 from notch 88 of link 78.

Figure 9:
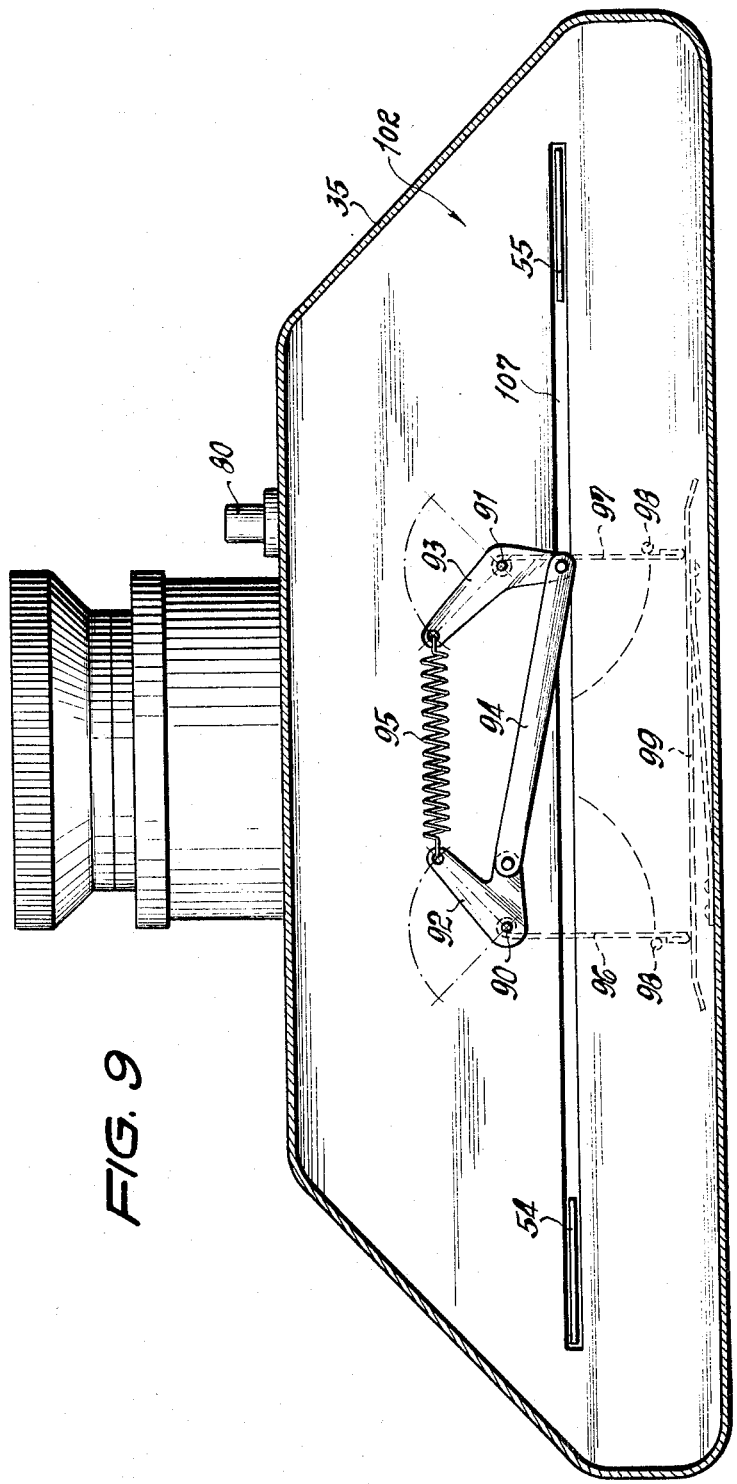
FIG. 9 is a horizontal sectional view taken along the line IX—IX on FIG. 7.

The back portions of the sides of exposure chamber 3a are constituted by flaps 96 and 97 (FIG. 5) which, at their forward edges, are secured on vertical shafts 90 and 91, respectively, having their upper and lower ends journaled in partitions 101 and 102 (FIGS. 7 and 10). The lower ends of shafts 90 and 91 project below partition 102 into lower compartment 106 and are there connected with levers 92 and 93 (FIGS. 7, 9 and 10). The levers 92 and 93 are pivotally connected to the opposite ends of a bar or link 94 which is arranged so that the respective flaps 96 and 97 will swing inwardly in opposite directions away from their normal or closed positions against stop pins 98, as indicated in broken lines on FIG. 9. Thus, when flap 96 swings inwardly in the counterclockwise direction away from its normal or closed position, as indicated by the arrow on FIG. 9, the link 94 connecting levers 92 and 93 causes the flap 97 to swing inwardly away from its rest position in the opposite or clockwise direction. The levers 92 and 93 are further connected by a tension spring 95 which urges both levers to turn in the directions for returning the respective flaps 96 and 97 to their normal or closed positions against the stop pins 98. It will further be seen on FIGS. 5, 9 and 10, that the back wall 4a of the camera body carries a resiliently mounted film backing plate 99 against which the back edges of flaps 96 and 97 bear when such flaps are in their normal positions.

The camera described above with reference to FIGS. 5 to 10, inclusive, operates as follows:

The two unexposed supplies of films 11a and 12a in strip form are accommodated in the camera on the unwinding spools 9a and 10a and the respective films are drawn from the unwinding spools through the film brakes 38 and 39 and then around the guide rollers 13a and 14a. The leading end portions of the films are suitably fastened to the winding spools 15a and 16a which are inserted in the corresponding spool holders or carriers 42 and 43.

When it is desired to position a length of one or the other of the films 11a and 12a for exposure thereof, the correpsonding one of the handles 52 and 53 is manually displaced across the back of the camera in the direction toward the other handle so as to effect corresponding displacement of the respective slide 47, holder 42 and winding spool 15a or slide 48, holder 43 and winding spool 16a away from the normal rest position thereof. During the initial portion of such displacement, the roller 71 of the pawl 67 or 68 is engaged by the guide track 72 or 73 so as to hold the pawl out of engagement with the ratchet wheel 60 or 61 and thereby permit the corresponding spool 15a or 16a to be turned in the unwinding direction, as hereinafter described. As the roller 71 of the pawl 67 or 68 moves out of engagement with the guide track 72 or 73, the spring 69 or 70 urges the pawl 67 or 68 into engagement with the ratchet wheel 60 or 61 to lock the spool 15a or 16a against turning in the unwinding direction so that further displacement of the spool 15a or 16a in the direction away from its rest position causes unexposed film to be drawn from the corresponding supply or unwinding spool 9a or 10a. During displacement of the winding spool 15a or 16a from its rest position to its working position at the opposite side of the exposure chamber, the spool holder 42 or 43 pushes against the first engaged flap 96 or 97 so as to swing the same inwardly and forwardly to its open position, as indicated in broken lines at 96' and 97' on FIG. 5, and the connecting linkage consisting of the levers 92 and 93 and the link 94 shown on FIG. 9 causes the other flap 97 or 96, respectively, to be simultaneously moved inwardly and forwardly to its open position out of the path of the displaced holder. As the displaced spool holder or carrier 42 or 43 moves beyond the exposure chamber 3a, spring 95 returns both flaps 96 and 97 to their closed positions at which the back edges of the flaps press the film trailing from the spool 15a or 16a against the resiliently mounted plate 99.

When the displaced spool 15a or 16a has reached its working position between the rest position of the other winding spool and the adjacent side of the exposure chamber, the displaced slide 47 or 48 engages behind the nose 77 or 76 of the lever 75 or 74, respectively, so that the displaced winding spool is retained in its working position against the force of the spring 49 urging the winding spool to return to its rest position. The camera is now in condition for exposure of the unexposed length of film extended across exposure chamber 3a in the focal plane of objective 2a.

Such exposure of the film may be effected by depressing the push-button 80 which, during its initial movement, may be made to effect the release of the camera shutter (not shown). Further depression of push-button 80 causes levers 74 and 75 to be rocked forwardly and thereby release nose 76 or 77 from engagement with slide 48 or 47. Upon disengagement of the nose 76 or 77 from the displaced slide 48 or 47, spring 49 acts to return the displaced slide and its respective spool holder and winding spool to the rest position thereof. Upon the return of the displaced slide 47 or 48 to its rest position, push-button 80 is released, but the engagement of nose 87 of latch 85 in notch 88 holds levers 74 and 75 in their forwardly rocked positions at which noses 76 and 77 are withdrawn from the path of movement of slides 47 and 48. The foregoing is necessary so that, on subsequent displacement of the slide 47 or 48 from its rest position, such displacement will not be blocked by engagement with the nose 76 or 77 prior to reaching the working position of the respective winding spool. However, it will be apparent that, as the slide 47 or 48 being displaced reaches approximately the center of rod 46, such slide engages hump 89 on bell crank 83 to rock the latter in the direction releasing nose 87 of latch 85 from notch 88 and thereby permits spring 81 to cause rearward rocking of levers 74 and 75 for returning noses 76 and 77 into the path of slides 47 and 48. Thus, before the displaced slide 47 or 48 reaches its working position, the levers 74 and 75 are again conditioned to retain the displaced slide at such working position.

It will be apparent that, during movement of the slide 47 or 48, the respective gear 62 or 63 rolls on the rack 64 and thereby tends to rotate the winding spool 15a or 16a in one direction or the other depending upon the direction of movement of the respective slide. During the initial displacement of the slide 47 or 48 away from its rest position, that is, when the pawl 67 or 68 is held out of engagement with the respective ratchet wheel by engagement of the roller 71 with the guide track 72 or 73, the rotation of the gear 62 or 63 is transmitted to the respective spool 15a or 16a for turning the latter in the unwinding direction. However, when the roller 71 moves off the respective guide track 72 or 73, so that the winding spool 15a or 16a is locked against further rotation in the unwinding direction, continued displacement of the slide 47 or 48 is accompanied by sliding or slipping of the plate springs 65 or 66 of the rotated gear 62 or 63 relative to the shaft 58 or 59 coupled to the winding spool.

During the return movement of the displaced slide or carrier 47 or 48 to its rest position by the force of spring 49, the ratchet wheel 60 or 61 can turn under its pawl 67 or 68 in the direction for winding the film on the spool 15a or 16a, and such turning of the winding spool is effected by the rotated gear 62 or 63 through the frictional drive constituted by the plate springs 65 or 66 engaging the shaft 58 or 59.

It will be noted that the spool 15a or 16a is turned in the direction for winding film thereon during its entire return movement from its working position back to its rest position so that the length of film wound on the spool 15a or 16a during its return movement is greater than the distance across the exposure chamber 3a. However, since the winding spool 15a or 16a is free to rotate in the unwinding direction during the initial portion of its displacement from the rest position to the working position, as described above, the length of unexposed film drawn from the spool 9a or 10a during each displacement of the spool 15a or 16a from its rest position to its working position is limited substantially to the distance across the exposure chamber. Thus, the appearance of substantial spaces between the images on the exposed film, and hence waste of the film, are avoided.

The film brakes 38 and 39 are designed and constructed to exert a drag on the respective films 11a and 12a that is substantially greater than the pull that can be exerted on the films by rotation of spools 15a and 16a through the frictional drive between gears 62 and 63 and the respective shafts 58 and 59. Thus, film can be drawn from the supply spool 9a or 10a only during that portion of the displacement of the winding spool 15a or 16a toward its working position during which turning of the latter spool in the unwinding direction is positively prevented by engagement of the pawl 67 or 68 with the ratchet wheel 60 or 61. The foregoing ensures that, as increasing amounts of the films are wound on spools 15a or 16a, thereby increasing the effective diameters of such spools, unexposed film will not be drawn from the supply or unwinding spools 9a and 10a during the return movements of the winding spools 15a and 16a to their rest positions.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention which is intended to be defined in the appended claims.

What is claimed is:

1. In a camera having a body containing an exposure chamber and an objective defining an image field within said chamber, a magazine and a carrier working position in said body at opposite sides of said exposure chamber, means in said magazine for holding therein a supply roll of unexposed film in strip form wound with a light-sensitive side facing inward, a spool carrier normally disposed at a rest position in said magazine and adapted to hold a winding spool having the leading end of said film attached thereto, means operable to displace said carrier and a winding spool thereon from said rest position across said exposure chamber to said working position, means for returning said carrier and spool from said working position to said normal rest position, means for preventing rotation of said winding spool during each displacement of said carrier across said exposure chamber in the direction from said magazine toward said working position so that a length of unexposed film extending from said supply roll to said spool will then be drawn lengthwise into the image field with said light-sensitive side facing said objective, and means for rotating said spool in the direction to wind thereupon the film so drawn into said field, with said light-sensitive side of the film facing inward, during each return movement of said carrier from said working position to said normal rest position.

2. In a camera having a body containing an exposure chamber and an objective defining an image field within said chamber, a magazine in said body at each of two opposite sides of said exposure chamber, means in each of said magazines for holding therein a supply of unexposed film in strip form, a spool carrier normally disposed at a rest position in each magazine which rest position is spaced laterally from said exposure chamber, each said spool carrier being adapted for holding a winding spool having attached thereto the leading end of the film from the supply roll in the same magazine as the rest position of the related carrier, means operable to individually displace each said carrier and a winding spool thereon from its rest position in one of the magazines across said exposure chamber to a working position located in the opposite magazine between said rest position in said opposite magazine and said exposure chamber, means for returning each said carrier and spool from said working position to its normal rest position, means associated with each said carrier for preventing rotation of the winding spool thereon during each displacement of the carrier across said exposure chamber in the direction from its rest position toward its working position, so that a length of the film attached to such spool and extending from the related supply roll of unexposed film will then be drawn lengthwise into the image field with said light-sensitive side facing said objective, and means for rotating the spool on each carrier in the direction to wind the film so drawn into said field, with said light-sensitive side of the film facing inward, upon the spool during each return movement of the carrier from its working position to its normal rest position.

3. A camera as in claim 2; the winding spool on each said carrier being rotatable in film unwinding direction with the displacement of the carrier during each displacement of the carrier from its said rest position to the adjacent side of said exposure chamber, whereby said length of unexposed film drawn from the supply upon each displacement of the carrier from its rest position to its working position will correspond substantially to the distance across the image field within the exposure chamber.

4. A camera as in claim 2; wherein said means for returning each said carrier from its working position to its normal rest position includes spring operated means connected with each carrier and continuously urging the latter to move in the direction toward the rest position thereof, and said means for rotating the spool on each carrier includes spring means continuously urging the spool on each carrier to rotate relative to the latter in the direction to wind the film on the winding spool.

5. A camera as in claim 2; wherein said means associated with each said carrier for preventing rotation of the winding spool thereon includes a ratchet wheel rotatably coupled with the winding spool, a pawl engageable with said ratchet wheel to prevent turning of the associated winding spool in the direction for unwinding the film therefrom, and means for engaging said pawl with the ratchet wheel in response to operation of said means to displace the associated carrier from its rest position to its working position.

6. A camera as in claim 5; wherein said means operable to displace each said carrier from its rest position to its working position includes a handle extending from each carrier to the exterior of said body for manual actuation in the direction from said rest position to said working position of the corresponding carrier, each handle being rockable relative to the respective carrier upon said manual actuation of the handle; and wherein said means for engaging said pawl with the ratchet wheel includes an engaging member on said handle extending from the corresponding carrier and pressing said pawl against said ratchet wheel upon rocking of the handle by said manual actuation thereof.

7. A camera as in claim 2; wherein said means for returning each said carrier from its working position to its normal rest position includes spring means respectively connected to said carriers and yieldably urging the carriers to their respective rest positions; and wherein said means for rotating the spool on each said carrier includes a drive member rotatable on the carrier and to which a rolling movement is imparted in response to movement of the respective carrier between its said rest and working positions, and frictional coupling means between said drive member and the winding spool held by the associated carrier for yieldably urging the spool to rotate with the drive member.

8. A camera as in claim 7; further comprising braking means engaging each film between said supply thereof and the respective winding spool and exerting a drag on the engaged film that exceeds the pulling force transmittable to the film through said frictional coupling means associated with the corresponding winding spool.

9. A camera as in claim 7; wherein said drive member rotatable on each said carrier is constituted by a gear meshing with a gear rack extending parallel to the path of movement of the carrier between its rest position and working position.

10. A camera as in claim 2; further comprising releasable retaining means for holding each said carrier in said working position thereof during the exposure of the length of film extended across said exposure chamber.

11. A camera as in claim 2; wherein said exposure chamber of the body has pivoted flaps forming portions of the opposite sides of the exposure chamber and urged to normal positions projecting into the path of movement of said carrier between the rest and working positions thereof to form light traps between said exposure chamber and said magazines, said flaps being deflectable from said normal positions by each said carrier to permit said movement of the carrier between the rest and working positions thereof.

12. A camera as in claim 11; further comprising a backing surface for the length of film extended across said exposure chamber, said flaps being operative in said normal positions to hold said length of the film against said backing surface.

13. A camera as in claim 11; further comprising means interconnecting said flaps to cause simultaneous pivotal movement thereof in opposite directions.

14. In a camera having a body containing an exposure chamber and an objective defining an image field within said chamber, a magazine in said body at each of two opposite sides of said exposure chamber, means in each of said magazines for holding therein a supply of unexposed film in strip form, a spool carrier normally disposed at a rest position in each magazine, which rest position is spaced laterally from said exposure chamber, each said spool carrier being adapted for holding a winding spool having attached thereto the leading end of the film from the supply in the same magazine as the rest position of the related carrier, means operable to individually displace each said carrier from its rest position in one of said magazines across said exposure chamber to a working position located in the opposite magazine between said rest position in said opposite magazine and said exposure chamber, means associated with each said carrier for preventing rotation of the winding spool thereon during each displacement of the carrier across said exposure chamber in the direction from its rest position to its working position, so that a length of the film attached to such spool will then be drawn from the related supply of unexposed film into the image field, and spring driven means for returning each said carrier from its working position to its normal rest position and for rotating the spool on the carrier in the direction to wind the film upon the spool during each return movement of the carrier to said normal rest position.

15. A camera as in claim 14; wherein said spring driven means includes spring means yieldably urging each said carrier to said rest position thereof, a drive member rotatable on each said carrier, a stationary member engaged by said drive member and along which the latter rolls in response to movement of the respective carrier between its rest and working positions, and frictional coupling means between said drive member and the winding spool held by the associated carrier for yieldably urging the spool to rotate with the drive member during rolling of the latter.

16. A camera as in claim 15; wherein said drive member rotatable on each said carrier is constituted by a gear and said stationary member is constituted by a gear rack extending parallel to the direction of movement of each carrier between its rest and working positions.

17. A camera as in claim 14; wherein said spring driven means includes, for each said carrier, a spring operated drum and a tape connected to the related carrier and wound on said drum to yieldably urge the carrier to its rest position, and spiral spring means yieldably urging the related winding spool to rotate in the direction for winding the film thereon.

18. A camera as in claim 14; wherein said spring driven means includes, for each said carrier, spiral spring means yieldably urging the related winding spool to rotate in the direction for winding the film thereon, thereby to return the carrier to its rest position by rolling of the winding spool along the previously extended film.

19. In a camera having a body containing an exposure chamber and an objective defining an image field within said chamber, a magazine in said body at each of two opposite sides of said exposure chamber, means in each of said magazines for holding therein a supply of unexposed film in strip form, a spool carrier normally disposed at a rest position in each magazine, which rest position is spaced laterally from said exposure chamber, each said spool carrier being adapted for holding a winding spool having attached thereto the leading end of the film from the supply in the same magazine as the rest position of the related carrier, means operable to individually displace each said carrier from its rest position in one of said magazines across said exposure chamber to a working position located in the opposite magazine between said rest position in said opposite magazine and said exposure chamber, pawl and ratchet means on each carrier normally engageable to prevent rotation of the associated winding spool in the direction for unwinding film therefrom, means disengaging said pawl and ratchet means of each carrier during each displacement of the carrier from its rest position to approximately the adjacent side of said exposure chamber so that film can then unwind from the associated winding spool and, during the remaining displacement of the carrier to its working position, a length of the film attached to said associated winding spool is drawn from the related supply of unexposed film into the image field, releasable retaining means for holding each said carrier in its working position during exposure of said length of film in the image field, spring means urging each said carrier to return from said working position to said rest position upon release of said retaining means, and drive means yieldably urging each said winding spool to rotate in the film unwinding direction upon displacement of the corresponding carrier from its rest position toward said working position and in the film winding direction upon return movement of the carrier from the working position to the rest position so that the length of exposed film is wound on the spool during said return movement.

20. A camera as in claim 19; wherein said drive means includes a gear rotatable on each said carrier and frictionally coupled with the related winding spool, and a stationary gear rack engaged by said gear on each carrier and extending parallel to the path of movement of the carriers.

21. A camera as in claim 19; wherein said exposure chamber of the body has pivoted flaps forming portions of the opposite sides thereof and being spring urged to normal closed positions projecting into the path of movement of said carriers between the rest and working positions thereof to form light traps between said exposure chamber and said magazines, each of said flaps being deflectable inwardly from its closed position by movement of a carrier into the exposure chamber from the adjacent side of the latter, and linkage means interconnecting said flaps to cause simultaneous pivotal movement thereof in opposite directions so that, when one of said flaps is deflected inwardly by a carrier, the other flap is also pivoted inwardly to permit movement of each said carrier between its rest and working positions.

22. A camera as in claim 21; further comprising a resiliently mounted backing plate in said body to lie in back of the length of film extended across the exposure chamber in the image field of said objective; and wherein said flaps, when in said closed positions, bear against said backing plate to hold the extended length of film flat against said plate.

23. The method of transporting film in a camera, which comprises providing a supply roll of unexposed film in strip form, wound with the light-sensitive side of the film facing inward, in a chamber to one side of the image field of the camera and for each exposure drawing a leading portion of the unexposed film from the supply roll lengthwise across the image field to the opposite side of said field, thus laying an unexposed length of the film in the image field with said light-sensitive side thereof facing the objective, then exposing said length in said field, and then by rolling up upon said light-sensitive side the exposed film length from the end thereof at said opposite side removing it from the image field and returning it into said chamber in the form of an exposed film roll wound with said light-sensitive side facing inward and connected with said supply through a new leading portion of the unexposed film.

References Cited by the Examiner

UNITED STATES PATENTS 2,245,606    6/1941    Rauch _____ 95—31
2,546,540    3/1951    Gruben _____ 93—31

FOREIGN PATENTS 1,051,632    2/1959    Germany.
1,071,472    12/1959    Germany.

NORTON ANSHER, *Primary Examiner.*

EVON C. BLUNK, *Examiner.*

VANCE A. SMITH, *Assistant Examiner.*